UNITED STATES PATENT OFFICE.

FRIEDRICH SCHMIDT AND KARL SCHIRMACHER, OF HÖCHST-ON-THE-MAIN, GERMANY, ASSIGNORS TO FARBWERKE, VORM. MEISTER, LUCIUS & BRÜNING, OF HÖCHST-ON-THE-MAIN, GERMANY, A CORPORATION OF GERMANY.

ORTHO-OXYMONOAZO DYE.

No. 826,281.      Specification of Letters Patent.      Patented July 17, 1906.

Application filed August 4, 1905. Serial No. 272,631.

*To all whom it may concern:*

Be it known that we, FRIEDRICH SCHMIDT, Ph. D., and KARL SCHIRMACHER, Ph. D., chemists, citizens of the Empire of Germany, residing at Höchst-on-the-Main, Germany, have invented certain new and useful Improvements in the Manufacture of Ortho-Oxymonoazo Dyestuffs, of which the following is a specification.

We have found that by combining the diazo compound of ortho-amido-meta-xylenol ($CH_3:CH_3:OHNH_2 = 1:3:4:5$) with 1:8:3:6-dioxynaphthalenedisulfonic acid, $$(C_{10}H_4(OH)_2(SO_3H)_2),$$

being the so-called "chromo-tropic" acid, a valuable monoazo dyestuff may be obtained which yields beautiful blue shades of great fastness when fixed as chrome-lake on chrome-mordanted wool or dyed on unmordanted wool and developed subsequently with chromates.

The manufacture of the dyestuff occurs as follows: Diazotized ortho-amido-meta-xylenol is combined with chromotropic acid in a strong caustic alkaline solution or in presence of hydrate of lime.

The composition of the dyestuff in the form of the sodium salt is represented by the following formula:

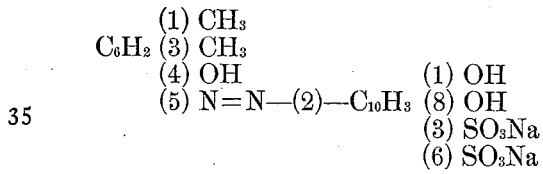

Example: 13.7 kilograms of ortho-amido-meta-xylenol ($CH_3:CH_3:OH:NH_2 = 1:3:4:5$) are dissolved in water while adding thirty kilograms of hydrochloric acid of about 20° Baumé and diazotized at about 0.5° centigrade with 6.9 kilograms of nitrite. This diazo solution is gradually introduced into a solution of thirty-eight kilograms of the disodium salt of chromotropic acid, $$C_{10}OH_4(OH)_2(SO_3Na)_2,$$

thirty kilograms of finely-divided hydrate of lime having been stirred in. After twenty-four hours the formation of the dyestuff is complete. It may be isolated by acidifying with hydrochloric acid and precipitating the dyestuff with common salt.

When dry, the dyestuff is a black powder of bronze luster soluble in water with a red color. This solution turns violet-blue on adding a solution of sodium carbonate, while dilute hydrochloric acid hardly produces any change in the color. In concentrated sulfuric acid the dyestuff dissolves with a violet-blue color. It dyes wool blue-red in an acid-bath. The dyeing of the chrome-lake is blue. By reducing with tin and hydrochloric acid the dyestuff is splitted into ortho-amido-meta-xylenol and amidochromotropic acid.

Having now described our invention, what we claim is—

As a new product, the ortho-oxymonoazo dyestuff having as a sodium salt the formula:

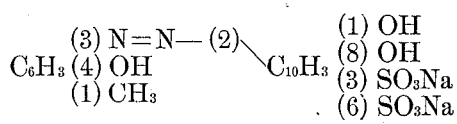

being a reddish-violet powder, soluble in water with a red color; the aqueous solution becomes blue-violet on addition of a solution of sodium carbonate; on addition of dilute hydrochloric acid hardly any change is produced in the color; in concentrated sulfuric acid the dyestuff dissolves with a blue-violet color; on reducing with tin and hydrochloric acid the dyestuff is split into ortho-amido-para-cresol and amido-chromotropic acid; it dyes wool blue-red in an acid-bath, the dyeing of the chrome-lake being blue.

In testimony that we claim the foregoing as our invention we have signed our names in presence of two subscribing witnesses.

FRIEDRICH SCHMIDT.
    KARL SCHIRMACHER.

Witnesses:
    ALFRED BRISBOIS,
    BERNHARD LEYDECKER.